US009803574B2

(12) United States Patent
Glugla et al.

(10) Patent No.: US 9,803,574 B2
(45) Date of Patent: Oct. 31, 2017

(54) METHOD AND SYSTEM FOR PRE-IGNITION CONTROL

(71) Applicant: Ford Global Technologies, LLC, Dearborn, MI (US)

(72) Inventors: Chris Paul Glugla, Macomb, MI (US); Paul Charles Mingo, Farmington Hills, MI (US); Robert Sarow Baskins, Grass Lake, MI (US); Sue Kay Wagers, Newport, MI (US)

(73) Assignee: Ford General Technologies, LLC, Dearborn, MI (US)

( * ) Notice: Subject to any disclaimer, the term of this patent is extended or adjusted under 35 U.S.C. 154(b) by 0 days.

(21) Appl. No.: 15/495,868

(22) Filed: Apr. 24, 2017

(65) Prior Publication Data

US 2017/0226944 A1 Aug. 10, 2017

Related U.S. Application Data

(60) Division of application No. 14/719,684, filed on May 22, 2015, now Pat. No. 9,644,564, which is a
(Continued)

(51) Int. Cl.
*F02D 41/00* (2006.01)
*F02B 37/00* (2006.01)
(Continued)

(52) U.S. Cl.
CPC .......... *F02D 41/0087* (2013.01); *F02B 37/00* (2013.01); *F02D 35/021* (2013.01); *F02D 35/027* (2013.01); *F02D 41/0007* (2013.01); *F02D 41/1446* (2013.01); *F02D 41/1475* (2013.01); *F02D 2200/1015* (2013.01)

(58) Field of Classification Search
CPC ............ F02D 41/1475; F02D 41/1446; F02D 41/0007; F02D 41/30; F02D 28/00; F02D 2200/1015; F02D 2250/22; F02D 2250/26; F02D 41/0087; F02D 35/021; F02D 35/022; F02D 35/023; F02D 35/024; F02D 35/025; F02D 35/026; F02D 35/027;
(Continued)

(56) References Cited

U.S. PATENT DOCUMENTS 4,219,250 A  8/1980  Inada et al.
4,454,718 A  6/1984  Sakakibara et al.
(Continued)

FOREIGN PATENT DOCUMENTS

EP  1400672 A2  3/2004
JP  H048847 A   1/1992
(Continued)

*Primary Examiner* — Stephen K Cronin
*Assistant Examiner* — Xiao Mo
(74) *Attorney, Agent, or Firm* — Julia Voutyras; McCoy Russell LLP

(57) ABSTRACT

Methods and systems are provided for addressing pre-ignition that may be induced in response to actions taken to mitigate a cylinder misfire. An amount of engine load limiting applied may be adjusted to reduce the likelihood pre-ignition while also addressing component over-temperature issues. By limiting an engine load while shutting off fuel in a misfiring cylinder, and while combusting a lean air-fuel mixture in the remaining cylinders, pre-ignition induced by the misfire-mitigating lean combustion conditions can be reduced.

5 Claims, 5 Drawing Sheets

Related U.S. Application Data continuation of application No. 13/310,437, filed on Dec. 2, 2011, now Pat. No. 9,038,596.

(51) Int. Cl.
*F02D 35/02* (2006.01)
*F02D 41/14* (2006.01)

(58) Field of Classification Search
CPC ........ F02D 35/028; F02D 13/04; F02D 41/12;
F02D 41/00; F02D 17/02; F02B 37/00;
F02P 5/00
See application file for complete search history.

(56) References Cited

U.S. PATENT DOCUMENTS

| | | |
|---|---|---|
| 4,556,030 A | 12/1985 | Aono |
| 5,386,367 A | 1/1995 | Ziegler et al. |
| 5,619,968 A | 4/1997 | Hillsberg et al. |
| 5,905,193 A | 5/1999 | Hashizume et al. |
| 6,044,824 A | 4/2000 | Mamiya et al. |
| 6,105,552 A | 8/2000 | Arisawa et al. |
| 6,354,264 B1 | 3/2002 | Iwakiri et al. |
| 6,520,159 B2 | 2/2003 | White et al. |
| 6,543,419 B2 | 4/2003 | Okamoto et al. |
| 6,561,163 B1 | 5/2003 | Takahashi et al. |
| 6,568,177 B1 | 5/2003 | Surnilla |
| 6,705,277 B1 | 3/2004 | McGee |
| 6,758,201 B2 | 7/2004 | Hosoi |
| 6,769,625 B2 | 8/2004 | Peterson, Jr. |
| 6,827,061 B2 | 12/2004 | Nytomt et al. |
| 6,883,497 B2 | 4/2005 | Wozniak et al. |
| 7,043,350 B2 | 5/2006 | Abe et al. |
| 7,128,048 B2 | 10/2006 | Yamoaka et al. |
| 7,178,503 B1 | 2/2007 | Brehob |
| 7,219,650 B2 | 5/2007 | Nagano et al. |
| 7,275,519 B2 | 10/2007 | Miyazaki et al. |
| 7,303,144 B2 | 12/2007 | Alyanak |
| 7,461,633 B2 | 12/2008 | Vangraefschepe et al. |
| 7,673,614 B2 | 3/2010 | Inada et al. |
| 7,694,666 B2 | 4/2010 | Lewis et al. |
| 7,721,710 B2 | 5/2010 | Leone et al. |
| 7,921,833 B2 | 4/2011 | Bidner et al. |
| 8,006,670 B2 | 8/2011 | Rollinger et al. |
| 8,073,613 B2 | 12/2011 | Rollinger et al. |
| 8,095,297 B2 | 1/2012 | Glugla et al. |
| 8,171,912 B2 | 5/2012 | Glugla et al. |
| 8,260,530 B2 | 9/2012 | Rollinger et al. |
| 8,439,011 B2 | 5/2013 | Glugla et al. |
| 8,447,502 B2 | 5/2013 | Rollinger et al. |
| 8,997,723 B2 | 4/2015 | Glugla et al. |
| 9,043,122 B2 | 5/2015 | Glugla et al. |
| 9,551,288 B2 | 1/2017 | Glugla et al. |
| 2005/0072402 A1 | 4/2005 | Zurloye et al. |
| 2006/0112932 A1 | 6/2006 | Toyoda |
| 2006/0243243 A1 | 11/2006 | Fukasawa |
| 2007/0119425 A1 | 5/2007 | Lewis et al. |
| 2007/0186903 A1 | 8/2007 | Zhu et al. |
| 2007/0215069 A1 | 9/2007 | Leone |
| 2007/0215107 A1 | 9/2007 | Shelby et al. |
| 2008/0229743 A1 | 9/2008 | Nelson |
| 2008/0283023 A1 | 11/2008 | Lewis et al. |
| 2009/0165458 A1 | 7/2009 | Matthews |
| 2009/0276147 A1 | 11/2009 | Hamama et al. |
| 2009/0292446 A1 | 11/2009 | Tanaka |
| 2009/0308146 A1 | 12/2009 | Gautrot et al. |
| 2010/0051379 A1 | 3/2010 | Graves |
| 2010/0094528 A1 | 4/2010 | Auclair et al. |
| 2010/0185378 A1 | 7/2010 | Hillion et al. |
| 2010/0217504 A1 | 8/2010 | Fujii et al. |
| 2011/0202260 A1 | 8/2011 | Cunningham et al. |
| 2011/0265758 A1 | 11/2011 | Glugla et al. |
| 2011/0313641 A1 | 12/2011 | Glugla et al. |
| 2012/0035835 A1 | 2/2012 | Glugla et al. |
| 2012/0245827 A1 | 9/2012 | Glugla et al. |

FOREIGN PATENT DOCUMENTS

| | | |
|---|---|---|
| JP | 2010037964 A | 2/2010 |
| JP | 2010209710 A | 9/2010 |

METHOD AND SYSTEM FOR PRE-IGNITION CONTROL

CROSS REFERENCE TO RELATED APPLICATIONS

The present application is a divisional of U.S. patent application Ser. No. 14/719,684 entitled "METHOD AND SYSTEM FOR PRE-IGNITION CONTROL," filed on May 22, 2015. U.S. patent application Ser. No. 14/719,684 is a continuation of U.S. patent application Ser. No. 13/310,437, entitled "METHOD AND SYSTEM FOR PRE-IGNITION CONTROL," filed on Dec. 2, 2011, now U.S. Pat. No. 9,038,596. The entire contents of each of the above-referenced applications are hereby incorporated by reference for all purposes.

FIELD

The present description relates generally to methods and systems for protecting a vehicle engine from pre-ignition and component overheating.

BACKGROUND/SUMMARY

Under certain operating conditions, engines that have high compression ratios, or are boosted to increase specific output, may be prone to low speed pre-ignition combustion events. The early combustion due to pre-ignition can cause high in-cylinder pressures, and can result in combustion pressure waves similar to combustion knock, but with larger intensity.

Applicants have recognized that under some operating conditions, steps taken to mitigate a cylinder misfire can also lead to an increased likelihood of pre-ignition. Specifically, in response to a cylinder misfire event, an engine controller may shut-off fuel to the misfiring cylinder to prevent an exhaust catalyst from over-heating. Additionally, the remaining cylinders may be operated leaner than stoichiometry to reduce the amount of unburned fuel. However, the lean cylinder operation may increase the propensity of engine pre-ignition, particularly at higher engine speeds, and expedite engine degradation.

The above issue may be at least partly addressed by a method of controlling a vehicle comprising, while driving the vehicle with an engine, operating a cylinder to pump air without injected fuel while another cylinder combusts a lean air-fuel mixture, and limiting air into the cylinders to be less than a threshold. In this way, by limiting the engine load when some cylinders have fuel shut off and other cylinders are operating lean, the propensity for inducing engine pre-ignition can be reduced.

In one example, in response to a misfire event in a first engine cylinder, fuel injection to the misfiring cylinder may be shut off while air continues to be pumped there-though. The remaining cylinders may then be operated with an air-to-fuel ratio that is leaner than stoichiometry to reduce the amount of unburned fuel remaining in the cylinders. To then reduce the likelihood of cylinder pre-ignition that may be induced by the lean operating conditions, in particular at medium to high engine speeds, an engine load may be limited. The load limiting may be based on the leanness of the lean air-to-fuel ratio as well as the number of cylinders running lean (or a number of cylinders operating with fuel shut-off). The load limiting may also be based on the engine's pre-ignition history (indicative of the engine's inherent propensity for pre-ignition), as well as the engine speed. As such, the amount and duration of load limiting may be adjusted to enable exhaust temperatures to be controlled and the likelihood of pre-ignition to e reduced. After the defined duration has elapsed, the load limiting may be ramped out.

In this way, by limiting an engine load during conditions when some cylinders are running lean and other cylinders have fuel shut-off, over-heating of an exhaust catalyst and related component degradation may be reduced. By reducing engine temperatures, the propensity for a cylinder pre-ignition event can also be reduced. By limiting an engine load during misfire mitigation, the likelihood of a pre-ignition event being induced by the misfire mitigation can also be reduced. Overall, engine degradation can be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Methods and systems are provided for addressing cylinder pre-ignition events as well as abnormal combustion events (e.g., a misfire) that may act as a precursor to cylinder pre-ignition events. In particular, load limiting of an engine, such as the engine system of FIG. 1, may be performed in response to actual or imminent pre-ignition. An engine controller may be configured to perform a control routine, such as the example routines of FIGS. 2-4, to adjust cylinder fuel injection (FIG. 2) as well as an engine load in response to an abnormal combustion event, such as a cylinder misfire event and/or a cylinder pre-ignition event. The load limiting may be adjusted (FIGS. 3-4) so as to reduce the likelihood of (further) cylinder pre-ignition events. Example load limiting adjustments are described herein with reference to FIG. 5. By limiting an engine load during misfire mitigation, the likelihood of a pre-ignition event being induced by the misfire mitigation can be reduced.

Figure 1:
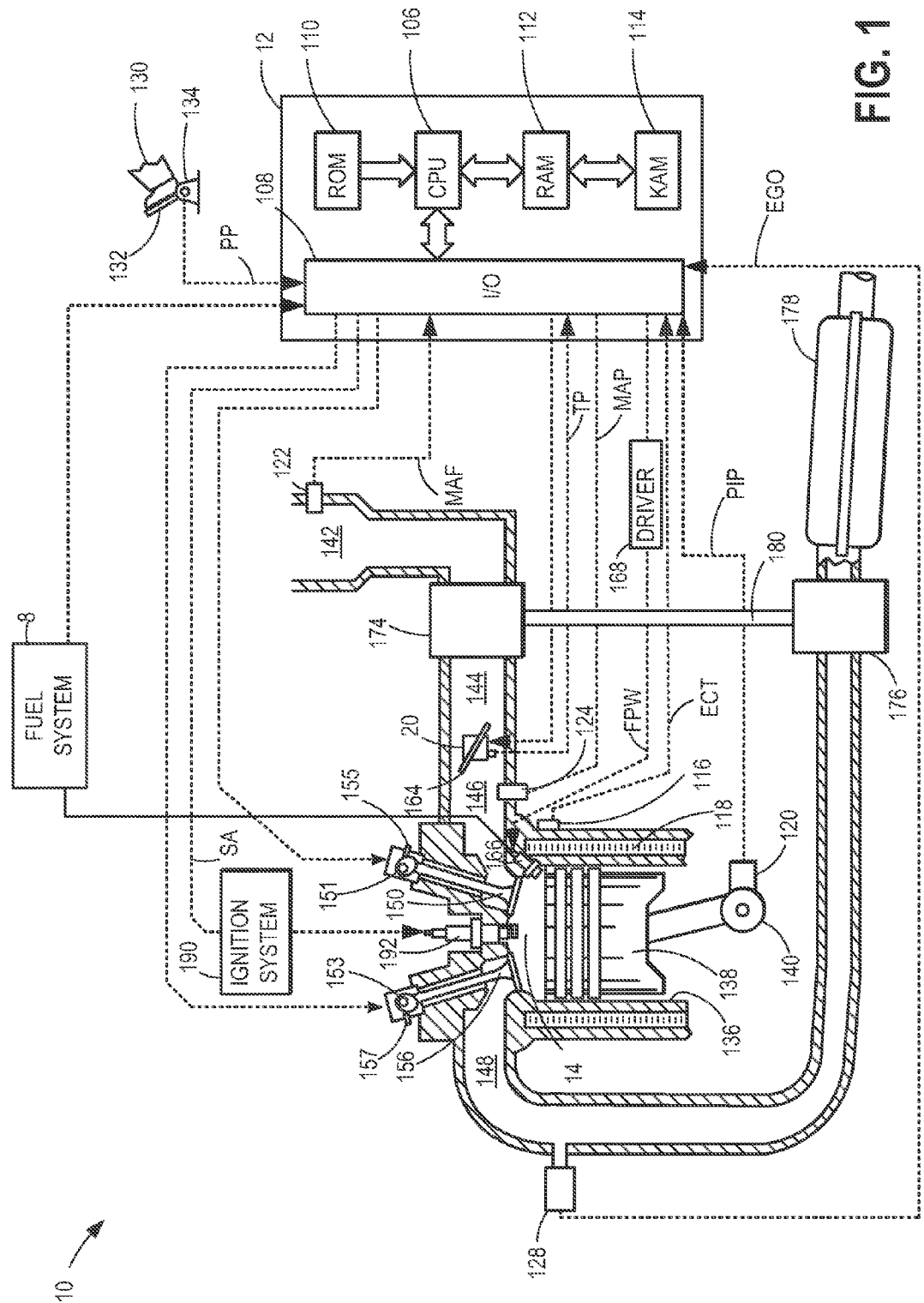
FIG. 1 shows an example combustion chamber.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines. Under some conditions, degradation of spark plug 162 can lead to misfires in combustion chamber 14. As such, if unattended, the degraded spark plug can also lead to an increased occurrence of cylinder pre-ignition events. Spark plug degradation may include, for example, spark plug wire degradation (e.g., loose wire, shorted wire), electrode degradation (e.g., worn out electrodes), spark plug fouling or smoldering, etc.

In one example, in response to an occurrence of a threshold number and/or rate of pre-ignition events in the cylinder following a cylinder misfire event during select engine operating conditions, an engine controller may infer that the spark plug is degraded and limit combustion in the affected cylinder at high engine loads. The controller may also limit an engine load. In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc. Engine 10 may further include one or more knock sensors (not shown) for sensing abnormal combustion events and differentiating abnormal combustion events due to knocking from those indicative of pre-ignition. For example, input from an in-cylinder knock sensor and/or a crankshaft acceleration sensor may be used to indicate an abnormal combustion event in the cylinder. The knock sensor may be an accelerometer on the engine block, or an ionization sensor configured in the spark plug of each cylinder. Based on characteristics of the knock sensor signal, such as a signal timing, amplitude, intensity, frequency, etc., and/or based on the crankshaft acceleration signal, the controller may identify pre-ignition. For example, a cylinder pre-ignition event may be determined based on a cylinder knock signal estimated in a first, earlier window being larger than a first, higher threshold, while a cylinder knock event may be determined based on a cylinder knock signal estimated in a second, later window being larger than a second, lower threshold. The windows in which the knock signals are estimated may be crank angle windows. Additionally, pre-ignition may be distinguished from knock based on the engine operating conditions at the time of abnormal combustion detection. For example, abnormal combustion detected at higher engine speeds and loads may be attributed to knocking while those at lower engine speeds and loads may be indicative of pre-ignition. As such, mitigating actions taken to address knock may differ from those taken by the controller to address pre-ignition. For example, knock may be addressed using spark retard and EGR while pre-ignition may be addressed by cylinder enrichment or enleanment, and with an amount of engine load limiting.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. Storage medium read-only memory 110 can be programmed with computer readable data representing instructions executable by processor 106 for performing the methods described below as well as other variants that are anticipated but not specifically listed.

As configured, the components of the engine system of FIG. 1 enable a method of controlling a vehicle comprising, while driving the vehicle with an engine, operating a cylinder to pump air without injected fuel while another cylinder combusts a lean air-fuel mixture, and limiting air into the cylinders to be less than a threshold. In this way, by limiting an engine load during selected conditions, such as in response to a cylinder misfire event, actual and/or imminent pre-ignition may be curbed, and the can be protected from degradation.

Figure 2:
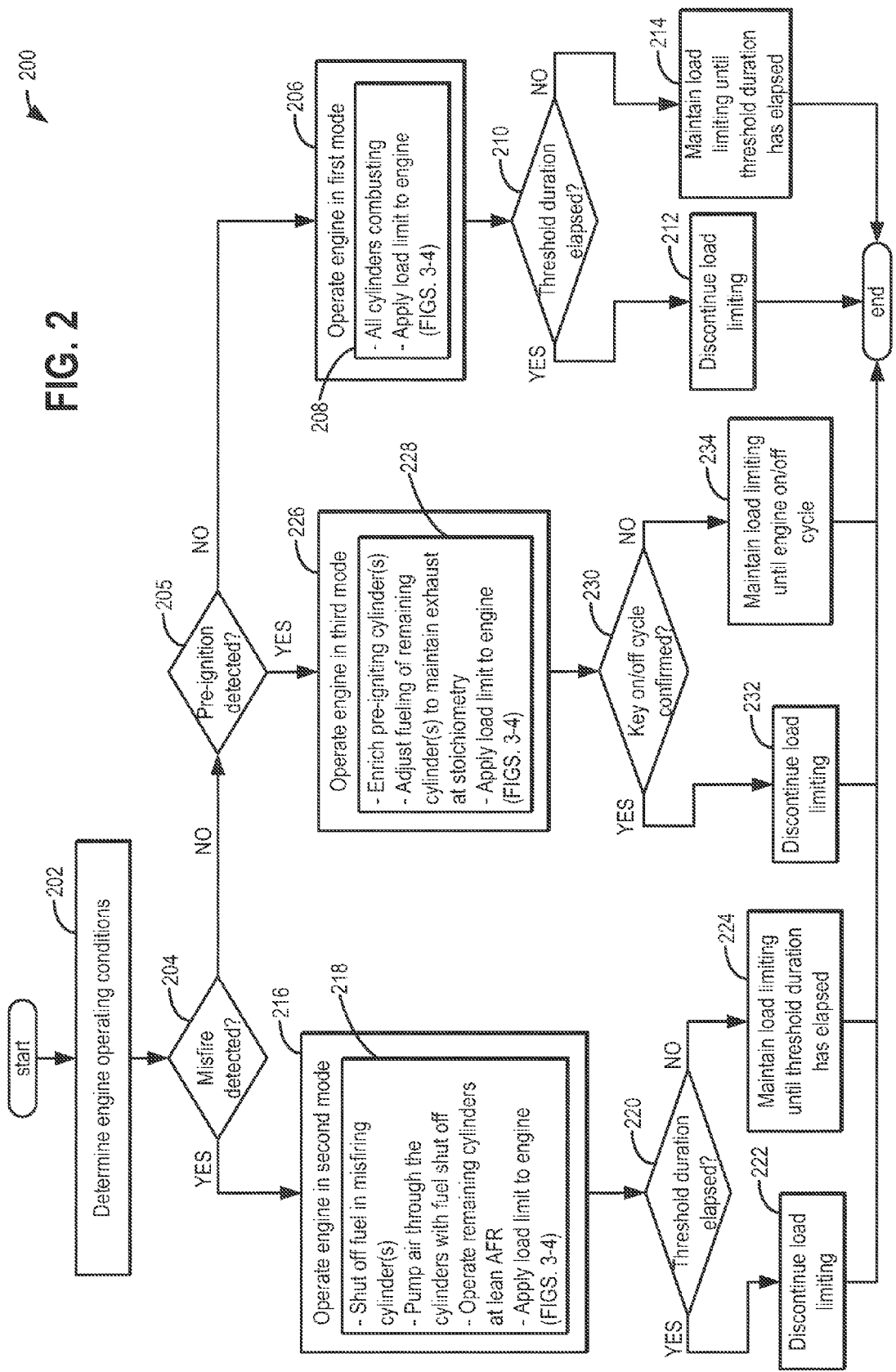
FIG. 2 shows a high level flow chart for adjusting cylinder fueling and limiting an engine load during selected engine operating conditions.

Now turning to FIG. 2, an example routine 200 is described for adjusting engine operations (in particular, fuel injection and engine load) in response to an abnormal combustion event, such as a cylinder misfire, to reduce the occurrence of imminent pre-ignition combustion events.

At 202, engine operating conditions may be determined. These may include, for example, engine speed, torque demand, engine load, engine temperature, exhaust temperature, catalyst temperature, manifold air pressure, manifold air temperature, engine pre-ignition history (including an engine and/or cylinder pre-ignition count), turbine inlet temperature (where the engine includes a turbocharger), etc.

At 204, it may be determined whether a misfire event has been detected in an engine cylinder. In one example, a cylinder misfire event is determined based on crankshaft acceleration. In another example, the cylinder misfire is based on an exhaust air-fuel ratio, for example, based on the output of an exhaust gas oxygen sensor (e.g., UEGO sensor). In still another example, the cylinder misfire is based on spark plug ionization (e.g., ionization current) as determined by an ionization sensor coupled to the spark plug.

If a cylinder misfire event is not determined, then the routine may proceed to 205 to determine if a pre-ignition event has been detected in an engine cylinder. As previously elaborated, a cylinder pre-ignition event may be identified and distinguished from cylinder knocking based on the output of a knock sensor. For example, in response to a knock signal output by the knock sensor being larger than a higher threshold in an earlier crank angle window, pre-ignition may be determined.

If no pre-ignition is detected, then at 206, an engine controller may operate the engine in a first mode (as elaborated at 208) with all cylinders combusting. Specifically, all the cylinders may be combusting at stoichiometry. Optionally, the engine may also be operated with an amount of load limiting, such as with a first load limit applied to the engine. In particular, the first load limit may be applied, if required, in anticipation of a pre-ignition event (that is, before any cylinder pre-ignition event actually occurs). As elaborated with reference to FIGS. 3-4, the first load limit may be selected based on engine operating conditions such as an engine speed, engine pre-ignition count, manifold charge temperature, inferred fuel octane, air fuel ratio, etc. For example, if the engine (or a particular cylinder) has a pre-ignition count that is higher than a threshold count, the engine may be predisposed to cylinder pre-ignition events, particularly under selected engine operating conditions (e.g., low speed conditions). Therefore, to reduce the likelihood of a pre-ignition event, more engine load limiting may be applied. The load limiting may be particularly applied during low engine speeds, when the possibility of pre-ignition is higher. In comparison, if the engine pre-ignition count is lower than the threshold count, engine pre-ignition may not be anticipated and no load limiting may be applied.

As used herein, limiting the engine load may include one or more of reducing an opening of an intake throttle, increasing an opening of a turbocharger wastegate, adjusting a cylinder valve timing to reduce an intake aircharge, and increasing an amount of exhaust gas recirculation. For example, the amount of intake aircharge directed into the engine may be reduced by a first amount, for example, until the engine load is reduced below a first threshold.

As such, the load limiting may be maintained until a (first) threshold duration or distance has elapsed. For example, in anticipation of low frequency preignition, the load limiting may be filtered out over a distance the vehicle is driven. In comparison, as elaborated herein, in response to high frequency pre-ignition occurrence, a load limiting may be performed that is exited with an ignition key cycle. For example, a timer may be started when the load limiting is initiated at 206. Then, at 210, it may be determined if the threshold duration has elapsed. If not, the first load limit may continue to be applied. In comparison, at 214, during the first mode of operation, the load limit may be reset (that is, load limiting may be discontinued) upon elapse of the threshold duration. The threshold duration may be based on, for example, an engine pre-ignition count, or the pre ignition count divided by the number of miles driven.

Returning to 204, if a cylinder misfire event is confirmed, the routine may be proceed to 216 wherein the engine controller may operate the engine is a second mode (as elaborated at 218) with a first number of cylinders pumping air without injected fuel, a second number of cylinders operating at an air-fuel ratio leaner than stoichiometry, and with an amount of load limiting, such as with a second load limit applied to the engine. Based on engine operating conditions the second load limit may be more restrictive that the first load limit. In particular, the second load limit may be applied to reduce the likelihood of a pre-ignition event being induced by the misfire mitigating cylinder adjustments.

In particular, during the second mode, the controller may shut off fuel to the misfiring cylinder(s) to mitigate the misfire and reduce the likelihood of further cylinder misfire events. However, the controller may continue to pump air through the misfiring cylinder(s) with the fuel shut off. To compensate for the fuel being shut off in the misfiring cylinder(s), the remaining engine cylinders may be operated with an air-fuel mixture that is leaner than stoichiometry. For example, the controller may apply an open-loop control to operate the engine at an air-to-fuel ratio that is leaner than stoichiometry. The controller may apply the open-loop control in the absence of any feedback control so as to better ensure that no excess fuel remains at the exhaust catalyst. As such, if the remaining engine cylinders were operated richer than stoichiometry, cylinder pre-ignition may not be induced, but an exotherm may be generated in the exhaust due to reaction of the fresh air being pumped from the deactivated cylinders (that is, the misfiring cylinders with the fuel shut off) with the excess fuel remaining at the catalyst. The exotherm may cause catalyst overheating and degradation.

In comparison, by running the remaining engine cylinders, a cooler exhaust temperature may be maintained, and catalyst degradation can be reduced. However, the lean engine operation used to mitigate the misfire event can itself induce cylinder pre-ignition, in particular at high engine speeds. Thus, to reduce the likelihood of pre-ignition occurring in response to the misfire mitigating lean engine operation, an engine load may be limited even prior to the occurrence or detection of a cylinder pre-ignition event.

As previously indicated, limiting the engine load may include one or more of reducing an opening of an intake throttle, increasing an opening of a turbocharger wastegate, adjusting a cylinder valve timing to reduce an intake aircharge, and increasing an amount of exhaust gas recirculation. Thus during the second mode of operation, the amount of intake aircharge directed into the engine may be reduced by a second amount (that may be larger or smaller than the first amount of the first load limit applied during the first mode of operation). For example, the second amount of load limiting may reduce the engine load limit below a second threshold that is lower than the first threshold. In one example, where the engine is a boosted engine, the second threshold may be based on a turbine inlet temperature. In still other examples, the threshold may be based on exhaust manifold, or exhaust valve temperature.

The limiting of air into the cylinders may be based on, for example, a degree of leanness of the lean air-fuel mixture, wherein the limiting is increased as the degree of leanness increases. In another example, the limiting may be based on an exhaust temperature, wherein the limiting is increased as the exhaust temperature increases above a threshold temperature (e.g., a temperature above which component degradation may occur). In still another example, the limiting may be based on an engine speed, wherein the limiting is increased when the engine speed is higher than a threshold speed. In particular, the limiting may be increased at higher engine speeds since the misfire mitigating steps may have a higher likelihood of inducing pre-ignition at higher engine speeds.

Figure 3:
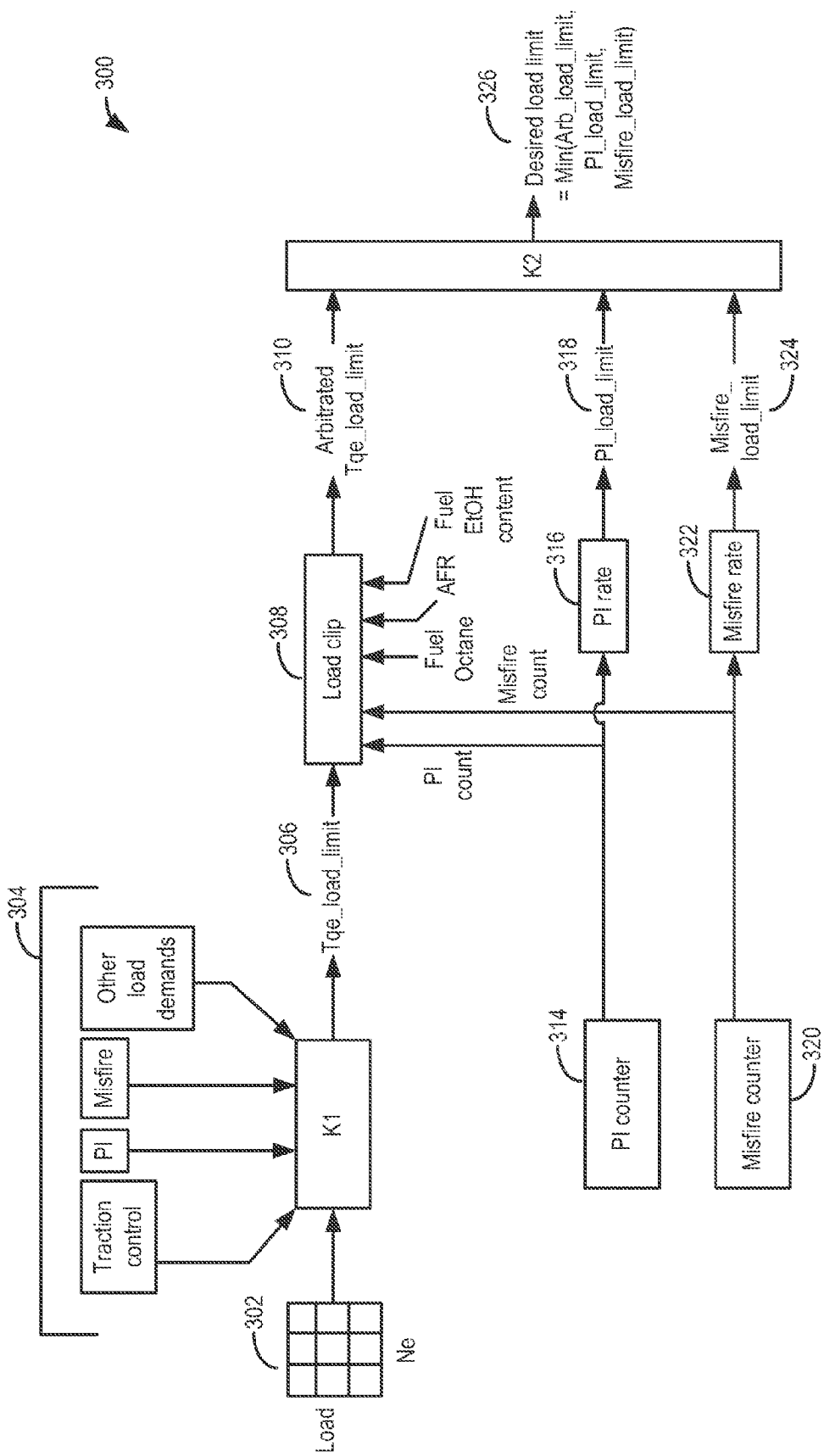
FIG. 3 shows a schematic depiction of a load limiting routine.
Figure 4:
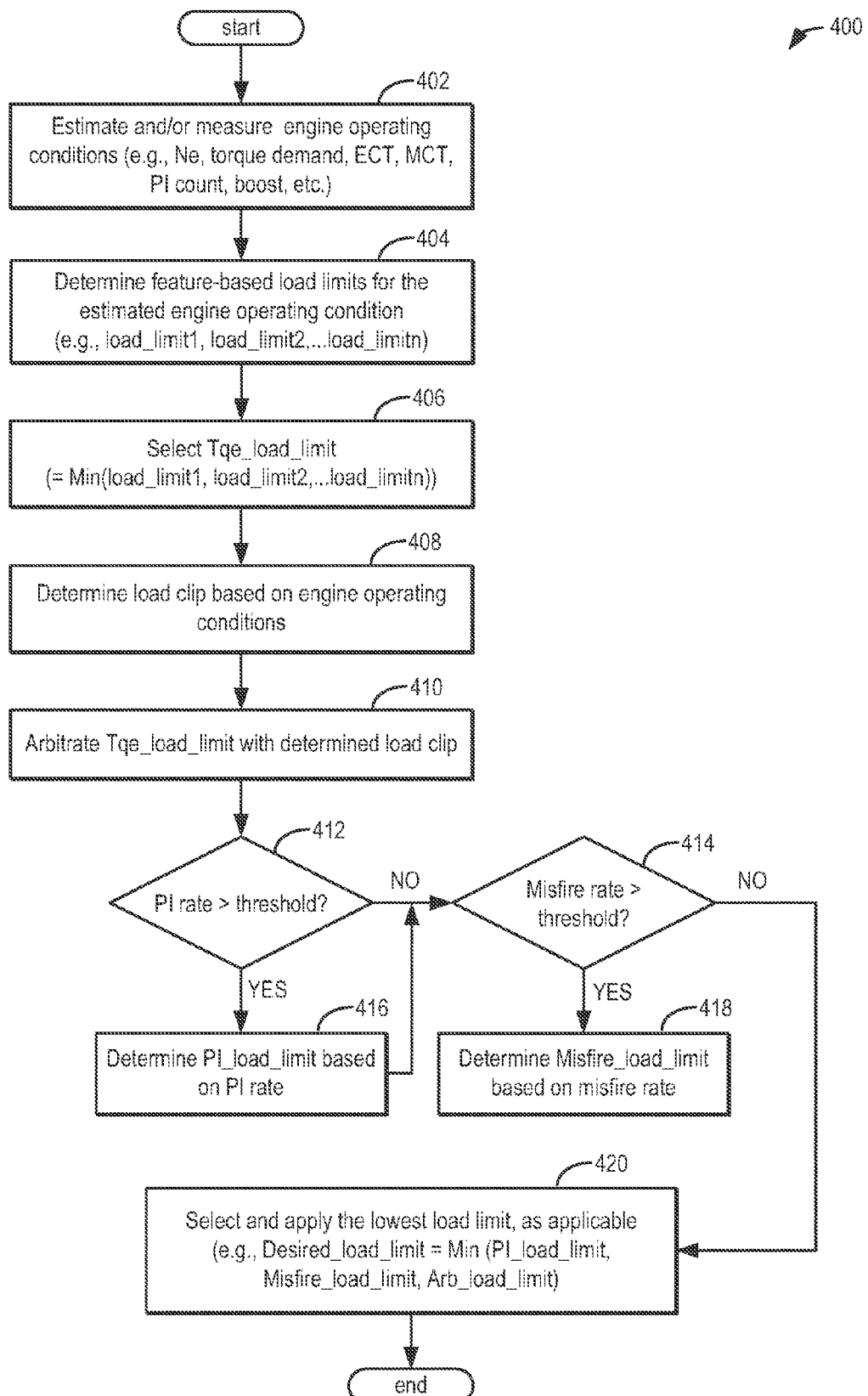
FIG. 4 shows a high level flow chart for selecting a load limit to be applied during the selected engine operating conditions of FIG. 2.

As elaborated in FIGS. 3-4, the load limiting applied may be based on various engine operating conditions including engine speed, the engine pre-ignition history (or engine pre-ignition count), the first number of cylinders that have been deactivated (that is, the number of cylinders wherein fuel has been shut off and only air is being pumped therethrough), as well as a degree of leanness of the lean air-to-fuel ratio. In one example, adjusting the limiting based on the pre-ignition history of the engine may include, increasing the load limit (that is, making the load limit more restrictive) as the pre-ignition count of the engine increases. In addition, a timer may be started when the second amount of load limiting is initiated. At 220, it may be determined if a (second) threshold duration has elapsed. If not, the load limit may be maintained at 224. In comparison, at 222, during the second mode of operation, the second load limit may be reset (that is, load limiting may be discontinued) upon elapse of the threshold duration. The threshold duration may be based on an engine pre-ignition count and an exhaust temperature. In another example, the load limiting may be discontinued after the engine is operated below a load threshold for a threshold duration, and fuel injection to all cylinders may be resumed. In one example, the (second) threshold duration after which the second load limit is reset may be longer than the (first) threshold duration after which the first load limit (applied during the first mode of operation) is reset.

In some embodiments, the limiting performed during each of the first and second modes of engine operation may be performed prior to the occurrence of an actual pre-ignition event in the engine. In response to a pre-ignition event in the engine occurring even after the load limiting is applied, the controller may be configured to further limit the air into the engine cylinders from the current threshold to a lower threshold. That is, a more restrictive load limiting may be used to mitigate the actual engine pre-ignition.

Returning to 205, if a cylinder pre-ignition event is confirmed, the routine may proceed to 226 wherein the engine controller may operate the engine is a third mode (as elaborated at 228) with all the cylinders combusting and at least one cylinder operating at an air-fuel ratio richer than stoichiometry. Specifically, the pre-ignition affected cylinder (or cylinders) may be enriched by an amount while fueling of the remaining cylinders is adjusted so that the exhaust is maintained at or around stoichiometry. In an alternate embodiment, instead of being enriched, the affected cylinder(s) may be enleaned by an amount while the fueling of the remaining cylinders is adjusted so that the exhaust is maintained at or around stoichiometry. By enriching (or enleaning) the pre-ignition affected cylinder in response to the pre-ignition event, further pre-ignition events may be mitigated. The duration and degree of the enrichment (or enleanment) may be based on, for example, the pre-ignition count of the affected cylinder, and/or the engine pre-ignition count. In addition, an amount of load limiting may be applied. For example, a third load limit may be applied to the engine, wherein the third load limit is more restrictive than at least the first load limit. As elaborated with reference to FIGS. 3-4. the third load limit may be based on various engine operating conditions including at least an engine speed, In one example, the second load limit may be more restrictive than the third load limit at higher engine speeds (when misfire induced pre-ignition is more likely) while the third load limit may be more restrictive than the second load limit at lower engine speeds (when pre-ignition is more likely). As such, the third load limit may be applied to mitigate the effects of the pre-ignition event. For example, the third amount of load limiting may reduce the engine load limit below a third threshold that is lower than the first threshold, and optionally lower than the second threshold.

During the third mode of operation, the third load limit may be reset in response to an engine-on/off cycle. Accordingly, at 230, it may be determined if an engine-on/off cycle has occurred. In one example, an engine-on/off cycle may be determined in response to a key-on/off event. At 232, in response to the engine-on/off cycle, the third load limit may be reset. That is, the third amount of load limiting may be discontinued. If an engine-on/off cycle is not confirmed, at 234, the third load limit may continue to be applied.

A rate at which the different load limits are ramped-in and/or ramped-out in the various modes may also differ. For example, the load limiting in response to an occurrence of pre-ignition (that is, the third load limit) may be implemented immediately, and with some temporary drivability degradation, where as the load limiting in response to a misfire event (that is, the second load limit) may have a period of time based on the time constant of the increase in component temperature to "ease" the load limit in place in such a way as to not cause poor drivability feel.

It will be appreciated that in some embodiments, the limiting performed during each of the first and second modes of engine operation may be performed prior to the occurrence of an actual pre-ignition event in the engine. In response to a pre-ignition event in the engine occurring even after the load limiting is applied, the controller may be configured to further limit the air into the engine cylinders from the prevalent threshold to a lower threshold. That is, a more restrictive load limiting may be used to mitigate the engine pre-ignition. In one example, in response to a pre-ignition event occurring while the engine is operating in the first or second mode, the controller may immediately shift the engine to the third mode, and apply the third, load limit if the third load limit is the most restrictive load limit.

It will be appreciated that while the depicted routine suggests that the third load limit is more restrictive than the second load limit, during selected operating conditions, the second load limit may (already) be more restrictive than the third load limit. For example, at low to medium engine speeds (e.g., 1000-2800 rpm), where incipient pre-ignition is more likely, the third load limit may be lower than the second load limit. However, at medium to high engine speeds (e.g., 3000-3500 rpm), induced pre-ignition may be more likely due to the lean cylinder operation of the non-misfiring cylinders. During those conditions, the second load limit may be lower than the third load limit. As elaborated in FIG. 3, an engine controller may be configured to assess the load limits based on various constraints at the given operating conditions, and then apply the lowest load limit that curbs pre-ignition.

As such, the more restrictive load limiting applied to the engine, in particular during the second and third modes of operation, may reduce the engine power. Thus, when applying the more restrictive load limits, an associated warning may be delivered to the vehicle operator to warm them of the upcoming reduced power state (e.g., an associated diagnostic mode of malfunction indication light may be set or illuminated). In addition, a timer counting down the time until the more restrictive load limiting is discontinued may also be displayed to indicate to the operator when engine power may be resumed.

Now turning to FIG. 3, a schematic depiction 300 of a load limiting routine is shown. The routine may start with a feed-forward portion of load limiting wherein load limiting is performed in anticipation of pre-ignition and taking into account various other load restricting conditions and load demands 304. Specifically, a first controller K1 may determine a load limits based on engine operating conditions, such as based on an engine speed-load condition 302, and also determine load limits corresponding to one or more load constraining conditions (or "features") and load demands. These may include, for example, load limits for providing appropriate traction control (e.g., a load limiting responsive to wheel slip), load limits in anticipation of a likelihood for pre-ignition or misfire, etc. The controller may select the lowest of all the load limits assessed to be a nominal load limit, or Tqe_load_limit 306, wherein this lowest load limit is applied in anticipation of pre-ignition.

The load limit may then be clipped with a load clip 308. The load clip may be based on various factors. In one example, the controller may start with a nominal load clip that is based on nominal conditions. This nominal load clip may be provided (e.g. read from a 2D map) as a function of engine speed and manifold charge temperature. The load clip may then be adjusted by a multiplication factor that ranges from −1 to 1. The factor may be based on feed-forward measurements such as fuel octane content, fuel ethanol or alcohol content, air-to-fuel ratio, engine pre-ignition count, and engine misfire count. Thus, a lean air-to-fuel ratio or a low octane fuel that will make the probability of pre-ignition go higher results in a load clip wherein the interpolation of the load clip moves the load limit to a lower value (such as a low effect pre-ignition mitigation value). In another example, a rich air-to-fuel ratio or a high octane content of the fuel may result in a higher load limit (such as a high effect pre-ignition mitigation value).

The load clip also includes the feedback portion of the pre-ignition load limiting, wherein the load limit is further adjusted based on a learned pre-ignition rate or count, as counted by pre-ignition counter 314. The pre-ignition rate increases as the number of pre-ignition events per vehicle miles driven increases, and decreases as the number of miles driven increases. As such, with enough miles, the pre-ignition rate can come back to zero and have no effect on load limiting if no pre-ignition is observed. However, the operating conditions can affect the anticipation of pre-ignition and hence the nominal load limit. The torque load limit is then arbitrated with the load clip by a second controller K2 to determine an arbitrated torque load limit 326.

In parallel, a pre-ignition counter may be counting the number of pre-ignition events. Once a threshold number of pre-ignition events is reached, pre-ignition counter 314 may be activated and may start to determine a pre-ignition rate 316. If the pre-ignition rate is high, a pre-ignition load limit PI_load_limit 318 may be calculated. This pre-ignition load limit may have a more aggressive "learn down rate" with miles and may be activated only when a large number of pre-ignition events have occurred in a small amount of time.

Also in parallel, a misfire counter may be counting the number of engine misfire events. Once a threshold number of misfire events is reached, misfire counter 320 may be activated and may start to determine a misfire rate 322. If there is misfire, a misfire load limit misfire_load_limit 324 may be calculated. This misfire load limit may be based at least on engine speed. Controller K2 may then select the desired load limit 326 to be the lowest of these load limits. Thus, the desired load limit may be the lowest of the arbitrated load limit, the pre-ignition load limit, and the misfire load limit. As elaborated herein, the pre-ignition and misfire load limits may be more restrictive than the arbitrated torque load limit, but may vary relative to each other based on engine speed. For example, at low engine speeds, where "inherent" pre-ignition is likely to occur, the pre-ignition load limit may be the most restrictive. In comparison, at higher engine speeds, such as when misfire-induced pre-ignition is likely to occur, the misfire load limit may be the most restrictive. By selecting the lowest of the possible load limits, pre-ignition may be reduced while addressing all other load affecting constraints. Now turning to FIG. 4, an example routine 400 is shown for adjusting an amount of load limiting to be applied in the routine of FIG. 2 based on various engine operating conditions. As such, various load limits may be determined based on various engine operating constraints. An engine controller may then select the lowest load limit (that is, the higher amount of load limiting) so as to meet the needs of the most constrained engine operating parameter.

At 402, engine operating conditions may be estimated and/or measured. These may include, for example, engine speed, driver demanded torque, engine pre-ignition count, exhaust catalyst temperature, engine coolant temperature, turbine inlet temperature, etc. At 404, based on the estimated engine operating conditions, a plurality of feature-based load limits may be determined for various load limiting requiring conditions (e.g., load_limit1, load_limit2, upto load_limitn for n different features). For example, a load limit may be determined based on the driver demanded torque, while another load limit may be determined based on the required amount of traction control. Still other load limits may be determined based on various engine component temperature constraints. These may include, for example, load limits for maintaining an engine temperature, a catalyst temperature, a turbine inlet temperature, a manifold charge temperature, etc. Likewise, load limits may be determined based on cylinder or engine pre-ignition count (or rate) and cylinder misfire count (or rate).

In one example, for each parameter, an initial feed-forward amount of load limiting may be determined that is based on engine speed, manifold charge temperature, inferred fuel octane, engine air-to-fuel ratio, etc. The feed-forward amount of load limiting may be a lower, less restrictive load limit that limits the amount of air into the cylinders to be less than a threshold. In addition, the initial load limit may enable exhaust gas temperatures to be maintained at or below a threshold temperature. As such, the initial feed-forward amount of load limiting may be applied in anticipation of a pre-ignition event. Then, a feedback adjustment may be made to the load limiting that is based on the pre-ignition count. For example, the load limit may be adjusted by a pre-ignition count factor that is a function of vehicle mileage. Thus, every pre-ignition event may increase the pre-ignition count factor while accumulated mileage may decrease the pre-ignition count factor. In an alternate embodiment, the pre-ignition count factor can also be a function of combustion cycles.

Next, at 406, the various load limits may be compared and the controller may select the lowest load limit (herein referred to as selected torque load limit "Tqe_load_limit"). That is, the controller may select the minimum of load_limit 1 through load_limitn. In one example, the various load limits may be stored in, and accessed from, a memory of the controller wherein the load limits are stored as load tables. The load tables may be implemented as a function of engine speed. By comparing the load limits (or load requests) from the various load tables and selecting the lowest load limit, an engine load may be provided wherein the likelihood of (further) pre-ignition is reduced while also addressing component over-temperature issues.

At 408, a load clip may be determined based on the estimated engine operating conditions to blend or arbitrate the selected torque load limit. For example, the load clip output by the controller may be a number between −1 and 1 and may be used as a multiplier for the selected torque. The load clip may be based on pre-ignition count, fuel octane, fuel ethanol content, pre-ignition count, misfire count, air-to-fuel ratio, etc. At 410, the load clip multiplier may be used to arbitrate the determined load limit. In an alternate embodiment, the clip load number between −1 and 1 may be used as an interpolation multiplier between the various computed high and low load limits determined at 404. s At 412, it may be determined if the pre-ignition rate is higher than a threshold. For example, it may be determined if a threshold number of engine pre-ignition events have occurred over a given mileage travelled by the vehicle. In an alternate embodiment, it may be determined if the number of engine pre-ignition events in the given drive cycle is higher than a threshold amount. If the pre-ignition rate (or count) is higher than the threshold, then at 416, a pre-ignition load limit (PI_load_limit) may be determined. Specifically, once the threshold number of pre-ignition events is reaches, the controller may look at additional pre-ignition events per vehicle miles travelled and integrate out (that is, reduce) the pre-ignition count factor at a more aggressive rate to determine a more restrictive engine load limit. The more restrictive pre-ignition load limit may more aggressively address pre-ignition.

If a high pre-ignition rate is not confirmed at 412, or after determining a pre-ignition load limit at 416, the routine proceeds to 414 where it is determined if the misfire rate (or count) is higher than a threshold. The misfire threshold may be calibrated for component over-temperature and/or an emissions threshold. For example, it may be determined if a threshold number of engine misfire events have occurred over a given mileage travelled by the vehicle. In an alternate embodiment, it may be determined if the number of engine misfire events in the given drive cycle is higher than a threshold amount. If the misfire rate (or count) is higher than the threshold, then at 418, a misfire load limit (misfire_load_limit) may be determined. For example, the determined torque limit may be adjusted with a misfire count factor based on the misfire rate to determine the misfire load limit. The more restrictive misfire load limit may more aggressively address misfire and misfire-induced pre-ignition.

At 420, the controller may select and apply the lowest load limit, as applicable. For example, if there is pre-ignition but not at a sufficiently high rate, then the controller may adjust the pre-ignition count factor based on the pre-ignition count and adjust the load clip accordingly. Thereafter, the controller may apply the clipped and arbitrated torque load limit Tqe_load-limit. If even after applying the clipped load limiting, the pre-ignition rate increases too fast, a pre-ignition load limit is determined and the lower of Tqe_load-limit and pre-ignition_load-limit may be applied. In one example, pre-ignition_load-limit is more restrictive than Tqe_load-limit. In another example, if after applying the clipped load limiting, the misfire rate increases too fast, a misfire load limit is determined and the lower of misfire_ load-limit Tqe_load-limit may be applied. In one example, misfire_load-limit is more restrictive than Tqe_load-limit.

In another example, if even after applying the clipped load limiting, the pre-ignition rate increases too fast, and a misfire rate increases, the lower of Tqe_load-limit, pre-ignition_ load-limit, and misfire_load_limit may be applied. As such, the pre-ignition load limit may be lower at lower engine speeds while misfire_load_limit may be lower at higher engine speeds. Thus, based on the engine operating conditions, the lowest load limit may change.

If the pre-ignition load limit is selected at 420, the restrictive load limit may remain activated or "latched" until an engine-on/off cycle or key-on/off cycle is confirmed. In comparison, if the misfire load limit is selected at 420, the restrictive load limit may remain activated or "latched" until it is confirmed that the engine load has remained below a threshold load for a period of time. After that threshold amount of time, cylinder combustion may be resumed. If cylinder combustion is successful with no further misfire events, the misfire load limit can be removed and any other load limits can be honored, if required.

As such, when the more restrictive pre-ignition load limiting is applied to the engine, engine power may be reduced. Thus, when applying the more restrictive load limit, an associated warning may be delivered to the vehicle operator to warm them of the upcoming reduced power state (e.g., an associated diagnostic mode of malfunction indication light may be set or illuminated). In addition, a timer counting down the time until the more restrictive load limiting is discontinued may also be displayed to indicate to the operator when engine power may be restored.

It will be appreciated that the determined load clip, or load limit, may be ramped in slowly so as to reduce torque disturbances. Specifically, the load clip may be filtered (for example, using a rolling average filter) over time (for example, using a filter constant) to slowly ramp the determined load clip. The controller may optionally coordinate the load ramping with the engine's fuel injection operation to reduce torque disturbances.

Figure 5:
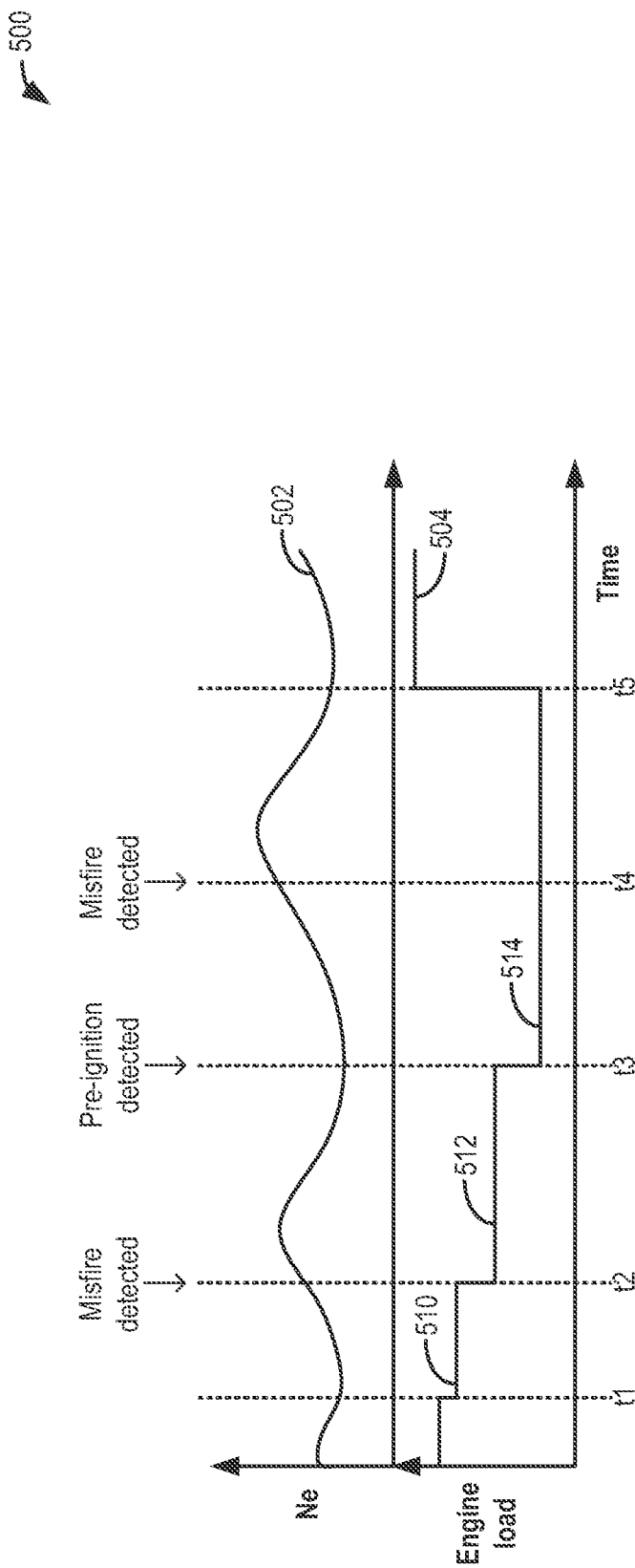
FIG. 5 shows example load limiting adjustments.

The routines of FIGS. 3-4 are further clarified by the example load limiting adjustments of FIG. 5. Specifically, map 500 of FIG. 5 depicts changes in an engine load at curve 504, at various engine speeds shown at curve 502.

Before t1, the engine may be operating with no load limiting. At t1, based on the engine's pre-ignition history, at the given engine operating conditions, pre-ignition may be anticipated. In particular, at the given engine load, and at the lower engine speed range, a cylinder pre-ignition event may be likely. Accordingly, at t1, the engine controller may limit the engine load by a first, small amount to bring the engine load down to load level 510. As such, this first load limiting may be performed prior to the occurrence of any cylinder pre-ignition event.

At t2, a cylinder misfire event may be detected. In response to the cylinder misfire event, the controller may pump air through the cylinder without injecting fuel therein. At the same time, the controller may combust a lean air-fuel mixture in the remaining cylinders to combust any excess unburned fuel at the exhaust catalyst. However, the lean operation may itself induce pre-ignition in the engine, in particular at medium to high engine speeds. Therefore, to reduce the likelihood of pre-ignition being induced by the misfire-mitigating lean cylinder operation, the engine load may be further limited to bring the engine load down to load level 512. This second load limiting may also be performed prior to the occurrence of any cylinder pre-ignition event.

At t3, a cylinder pre-ignition event may be detected. In response to the cylinder pre-ignition event, at least the pre-ignition affected cylinder may be temporarily enriched while the remaining cylinders are fueled so as to maintain the exhaust at or around stoichiometry. To reduce the likelihood of further cylinder pre-ignition events, that would otherwise lead to engine degradation, the engine load may be further limited to bring the engine load down to load level 514.

At t4, before the load limiting can be reset, a cylinder misfire event may be determined. Herein, in response to the cylinder, as at t2, the controller may pump air through the cylinder without injecting fuel therein, while combusting a lean air-fuel mixture in the remaining cylinders. However, since the engine load is already limited to an engine load 514, that is lower than the engine load 512 otherwise required to address the misfire-induced pre-ignition, no further load limiting may be performed. At t5, in response to a key-on/off event, the load limiting may be discontinued and the engine load may be restored.

Thus, if pre-ignition anticipating load limiting is taking place, along with some minor load limiting due to detected pre-ignition events, and then suddenly the misfire load limiting turns on, it will limit the engine load so as to protect exhaust components while also further reducing pre-ignition tendency via the lower load limit. However, if the pre-ignition events continue to occur, load limiting will be in control until the correct exit conditions are met. In this way, by reducing an engine load during misfire-mitigating lean combustion conditions, thermal overloading of engine components can be reduced while also reducing the likelihood of pre-ignition induced by the lean combustion conditions. By selecting and applying a load limit that addresses component temperature as well as pre-ignition constraints, engine degradation from pre-ignition can be reduced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
    an engine including a plurality of cylinders, each of the plurality of cylinders including a spark plug and a direct fuel injector;
    an intake throttle;
    a turbocharger including an intake compressor driven by an exhaust turbine;
    a knock sensor coupled to an engine block;
    an ionization sensor coupled to each spark plug for estimating an ionization current; and
    a control system with code programmed into a computer readable storage medium for:
    indicating a cylinder misfire event based on the ionization current of a spark plug; and
    in response to the indication of a cylinder misfire event, shutting off fuel to a misfiring cylinder;
        operating remaining cylinders at an air-fuel ratio leaner than stoichiometry; and
        reducing an opening of the intake throttle to limit an engine load below a threshold based on a degree of leanness of the air-fuel ratio, and to maintain a turbine inlet temperature below a threshold temperature.

2. The system of claim 1, wherein the controller includes further instructions for:
    indicating a cylinder pre-ignition event based on an output of the knock sensor; and
    in response to the indication of a cylinder pre-ignition event,
        enriching or enleaning a pre-ignition affected cylinder; and
        further reducing the opening of the intake throttle to further limit the engine load.

3. The system of claim 1, wherein the controller includes further instructions for:
    further reducing the opening of the intake throttle when engine speed is higher than a threshold speed to further limit the engine load.

4. The system of claim 2, wherein the cylinder misfire event occurs before the cylinder pre-ignition event in a given drive cycle.

5. The system of claim 2, wherein the controller includes further instructions for:
    discontinuing the limiting of the engine load responsive to the indication of the cylinder misfire event upon elapse of a threshold duration, the threshold duration based on each of an engine pre-ignition count and an exhaust temperature; and
    discontinuing the further limiting of the engine load responsive to the indication of the cylinder pre-ignition event after one of a key-on event and a key-off event.

* * * * *